(12) United States Patent
Tiramani et al.

(10) Patent No.: US 11,007,921 B2
(45) Date of Patent: May 18, 2021

(54) WHEELED ASSEMBLY FOR ITEM TRANSPORT

(71) Applicant: Build IP LLC, Las Vegas, NV (US)

(72) Inventors: Paolo Tiramani, Las Vegas, NV (US); Kyle Denman, North Las Vegas, NV (US)

(73) Assignee: Build IP LLC, Las Vegas, NV (US)

( * ) Notice: Subject to any disclaimer, the term of this patent is extended or adjusted under 35 U.S.C. 154(b) by 293 days.

(21) Appl. No.: 16/143,628

(22) Filed: Sep. 27, 2018

(65) Prior Publication Data

US 2019/0100127 A1    Apr. 4, 2019

Related U.S. Application Data

(60) Provisional application No. 62/568,491, filed on Oct. 5, 2017, provisional application No. 62/567,579, filed on Oct. 3, 2017.

(51) Int. Cl.
  *B60P 3/40*    (2006.01)
  *B60G 9/00*    (2006.01)
  (Continued)

(52) U.S. Cl.
  CPC .............. *B60P 3/40* (2013.01); *B60G 9/00* (2013.01); *B62B 5/0086* (2013.01); *E04B 1/19* (2013.01); *E04B 1/3445* (2013.01); *E04B 1/34357* (2013.01); *B60G 9/02* (2013.01); *B60G 2200/44* (2013.01); *B60G 2300/38* (2013.01);
  (Continued)

(58) Field of Classification Search
  CPC .. B60P 3/40; B60P 1/6445; E04B 1/19; E04B 1/34357; E04B 1/3445; E04B 2001/0076; E04B 2001/1984; E04B 2001/199; E04B 2002/567; B60G 9/00; B60G 2300/402;
  (Continued)

(56) References Cited

U.S. PATENT DOCUMENTS 2,968,490 A * 1/1961 Baus ................ B62D 53/0864
                                                   280/35
3,147,024 A * 9/1964 Brockman ............. B61F 5/307
                                                   280/81.1
(Continued)

FOREIGN PATENT DOCUMENTS

CA        2442403 C    3/2005

OTHER PUBLICATIONS

NPL-3 Search Report & Written Opinion, dated Jan. 29, 2019 in corresponding PCT application No. PCT/US2018/053015.
(Continued)

*Primary Examiner* — Anne Marie M Boehler
*Assistant Examiner* — Felicia L. Brittman
(74) *Attorney, Agent, or Firm* — McCarter & English, LLP (57) ABSTRACT

A transport assembly for a shipping module which has a chassis; a towing element secured to the chassis; two opposed wheels mounted on the chassis; a support assembly secured to the chassis and configured to be positioned in a mating relationship with a shipping module proximate to a lower transverse edge of the shipping module; means for removably securing the support assembly to a shipping module; and a displacement actuator secured between the chassis and the cradle, said displacement actuator for varying the ground clearance of a shipping module when secured to the support assembly.

12 Claims, 7 Drawing Sheets

(51) Int. Cl.
    *B60P 1/64* (2006.01)
    *B62D 63/08* (2006.01)
    *B60G 9/02* (2006.01)
    *B62D 53/06* (2006.01)
    *E04G 21/14* (2006.01)
    *B62B 5/00* (2006.01)
    *E04B 1/19* (2006.01)
    *E04B 1/343* (2006.01)
    *E04B 1/344* (2006.01)
    *E04B 1/00* (2006.01)
    *E04B 2/56* (2006.01)

(52) U.S. Cl.
    CPC ...... *B60G 2300/402* (2013.01); *B60P 1/6445* (2013.01); *B62D 53/067* (2013.01); *B62D 63/08* (2013.01); *E04B 2001/0076* (2013.01); *E04B 2001/199* (2013.01); *E04B 2001/1984* (2013.01); *E04B 2002/567* (2013.01); *E04G 21/14* (2013.01)

(58) Field of Classification Search
    CPC .. B60G 2300/38; B60G 2200/44; B60G 9/02; B62B 5/0086; B62D 63/08; B62D 53/067
    USPC ........................................................ 280/404
    See application file for complete search history.

(56) References Cited

U.S. PATENT DOCUMENTS

| | | | | |
|---|---|---|---|---|
| 3,497,231 | A | * | 2/1970 | Fulmer ............... B60P 1/6445 280/35 |
| 3,624,786 | A | | 11/1971 | Lundahl |
| 3,631,999 | A | * | 1/1972 | Walerowski ......... B65D 90/146 414/458 |
| 7,326,022 | B2 | * | 2/2008 | Brown .................. B60P 1/025 280/656 |
| 7,444,953 | B1 | * | 11/2008 | Player ................... B63B 45/04 114/343 |
| 7,740,257 | B2 | | 6/2010 | Haire |
| 8,474,194 | B2 | | 7/2013 | Tiramani |
| 8,733,029 | B2 | | 5/2014 | Tiramani |
| 2003/0071426 | A1 | * | 4/2003 | Larouche ............. B62B 5/0083 280/47.2 |
| 2005/0283371 | A1 | | 12/2005 | Tiramani |
| 2007/0096473 | A1 | * | 5/2007 | Ortega ................ E05B 1/0053 292/1 |

OTHER PUBLICATIONS

NPL 1—L1019-Genuine-Parts-Flyer, Air Springs, attached.
NPL 2—Hendrickson-Trailer Air Springs-Hendrickson Genuine Parts, attached.
U.S. Appl. No. 16/143,598, filed Sep. 27, 2018, Paolo Tiramani et al.

* cited by examiner

WHEELED ASSEMBLY FOR ITEM TRANSPORT

CROSS-REFERENCE TO RELATED APPLICATIONS

This application claims the benefit of U.S. Provisional Application No. 62/568,491, filed Oct. 5, 2017, and claims the benefit of U.S. Provisional Application No. 62/567,579, filed Oct. 3, 2017.

BACKGROUND OF THE INVENTION

Field of the Invention

This invention relates to means for transporting items, such as rectilinear boxes, containers and the like, over relatively flat surfaces, such as roads and highways. In one embodiment, this invention relates to means for transporting to a building site interrelated components utilized for constructing structures, such as dwellings and other buildings, for residential occupancy, commercial occupancy and/or material storage.

Description of Related Art

In the field of residential housing, the traditional technique for building homes is referred to as "stick-built" construction, where a builder constructs housing at the intended location using in substantial part raw materials such as wooden boards, plywood panels, and steel Lally columns. The materials are assembled piece by piece over a previously prepared portion of ground, for example, a poured concrete slab or a poured concrete or cinder block foundation.

There have been a variety of efforts to depart from the conventional construction techniques used to create dwellings, as well as commercial spaces and like. One of the alternatives to stick-built construction is very generally referred to as modular housing. As opposed to stick-built construction, where the structure is built on-site, a modular house is constructed in a factory and then shipped to the site, often by means of a tractor-trailer. A drawback of modular housing is that the prospective buyer can customize the structure layout only to a relatively limited degree. That is, while certain features, for example a closet, may be added or subtracted from a room, the general shape and layout of the house cannot be changed or adapted to the customer's preference.

Additionally, modular housing often exceeds in size normally-permitted legal limits for road transport. For example, in the United States the maximum permitted dimensions for road transport are in general 102 inches in width, 13.5 feet in height and 65 to 75 feet in length. Thus, in many cases transporting a modular house from factory to site requires oversize load permits, which may impose restrictions on when transport can be undertaken and what routes can be utilized. Oversize road regulations may also require the use of an escort car and a trailing car as well. All of these requirements and restrictions inevitably increase the cost of the modular housing.

Another alternative to stick-built construction is what is commonly referred to as a mobile home or trailer home. Mobile and trailer homes, like modular housing, are constructed in a factory and then transported to the intended location. They can be configured as two or three separate pieces which are joined at the receiving location, in which case they are referred to in the United States as a double-wide or a triple wide. Mobile and trailer homes often require less on-site finishing prior to occupancy than modular housing. On the other hand, such homes generally are almost always single story, tend to have a limited floor plan essentially dictated by transport requirements, and often cannot be customized by the buyer to any substantial degree. Like modular houses, mobile and trailer homes often exceed oversize road regulations with the attendant drawbacks described above.

There are also temporary offices, or site trailers, which are similar in dimension to a trailer house. Temporary offices are typically rendered in steel, and are simply sheltered locations containing storage, office and meeting areas. They are not suitable for permanent residency or occupancy.

Among the more attractive alternatives to stick-built construction are those disclosed in U.S. Provisional Patent Application Ser. No. 62/567,579, filed Oct. 3, 2017, as well as U.S. Pat. Nos. 8,474,194 and 8,733,029. These alternatives are directed to components, such as wall, floor and ceiling components, which are manufactured in a facility such as a factory, after which they can be can be positioned together as a shipping module and then delivered to a construction site. The components can then be assembled at the construction site into structures suitable for human or material occupancy, such as housing, offices, retail space, and warehouse use.

The components of these alternatives are advantageously finished to a degree that permits relatively speedy construction and finishing of the structure, yet can be customized on-site in an open-ended variety of styles, and can be assembled in a multitude of configurations. These inventive alternatives accordingly accord the user both the advantages of individualized customized construction and the efficiency and economy of prefabrication.

SUMMARY OF THE INVENTION

The present invention provides an easy and efficient means for the movement of items such as rectilinear boxes, containers and the like, over relatively flat surfaces, such as roads and highways. For example, it provides a means of moving containerized cargo by road using a non-commercial vehicle, without the need for a flatbed, intermodal or similar chassis. As another example, it provides an improvement in the ease and efficiency of moving to a construction site interrelated wall, floor and ceiling components assembled as a shipping module. The present invention advantageously permits dispensing with the use of a tractor trailer, as delivery can be accomplished using a pick-up truck equipped with a trailer hitch.

In one aspect, the present invention is directed to a transport assembly for a shipping module, wherein the transport assembly comprises a chassis; a towing element secured to the chassis; two opposed wheels mounted on the chassis; a support assembly secured to the chassis and adapted to be positioned in a mating relationship with a shipping module proximate to a lower transverse edge of the shipping module; means for removably securing the support assembly to a shipping module; and a displacement actuator secured between the chassis and the support assembly, said displacement actuator for varying the ground clearance of a shipping module when secured to the support assembly.

These and other aspects of the present invention are described in the drawings annexed hereto, and in the description of the preferred embodiments and claims set forth below.

BRIEF DESCRIPTION OF THE DRAWINGS

FIG. 1C depicts a top view of the transport assembly of the present invention.

DETAILED DESCRIPTION OF THE PREFERRED EMBODIMENTS

In the figures, there is shown a transport assembly 100 for moving a shipping module 200. The shipping module 200 has a lower first transverse edge 210 and a lower second transverse edge 220.

The shipping module 200 can be one of a wide variety of loads, such as a standard shipping container, a box-like structure, an elongated assembly of components or the like. In one application, the shipping module 200 includes one or more floor components, wall components and ceiling components, which can be pivotally connected in a manner so that when the components are "unfolded" they form a complete structure. Further information about these components and the structure they form, including preferred dimensional relationships, dimensions, interior component design and other aspects relating to packaging, transport and deployment are disclosed in U.S. Provisional Patent Application Ser. No. 62/567,579, filed Oct. 3, 2017, and U.S. Pat. Nos. 8,474,194 and 8,733,029, each of which is incorporated by reference as if fully set forth herein.

Figure 1A:
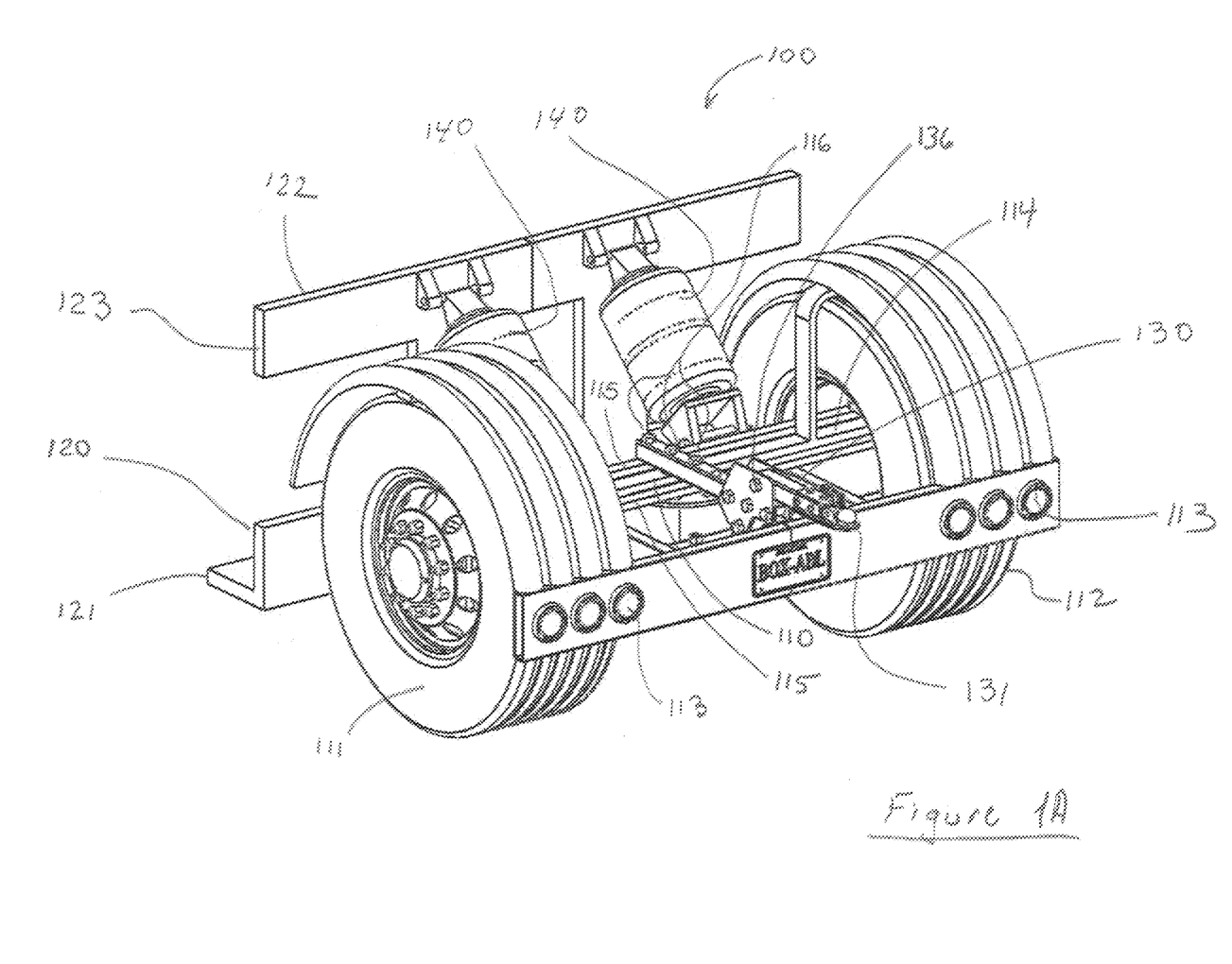
FIG. 1A depicts a perspective view of the transport assembly of the present invention.
Figure 1B:
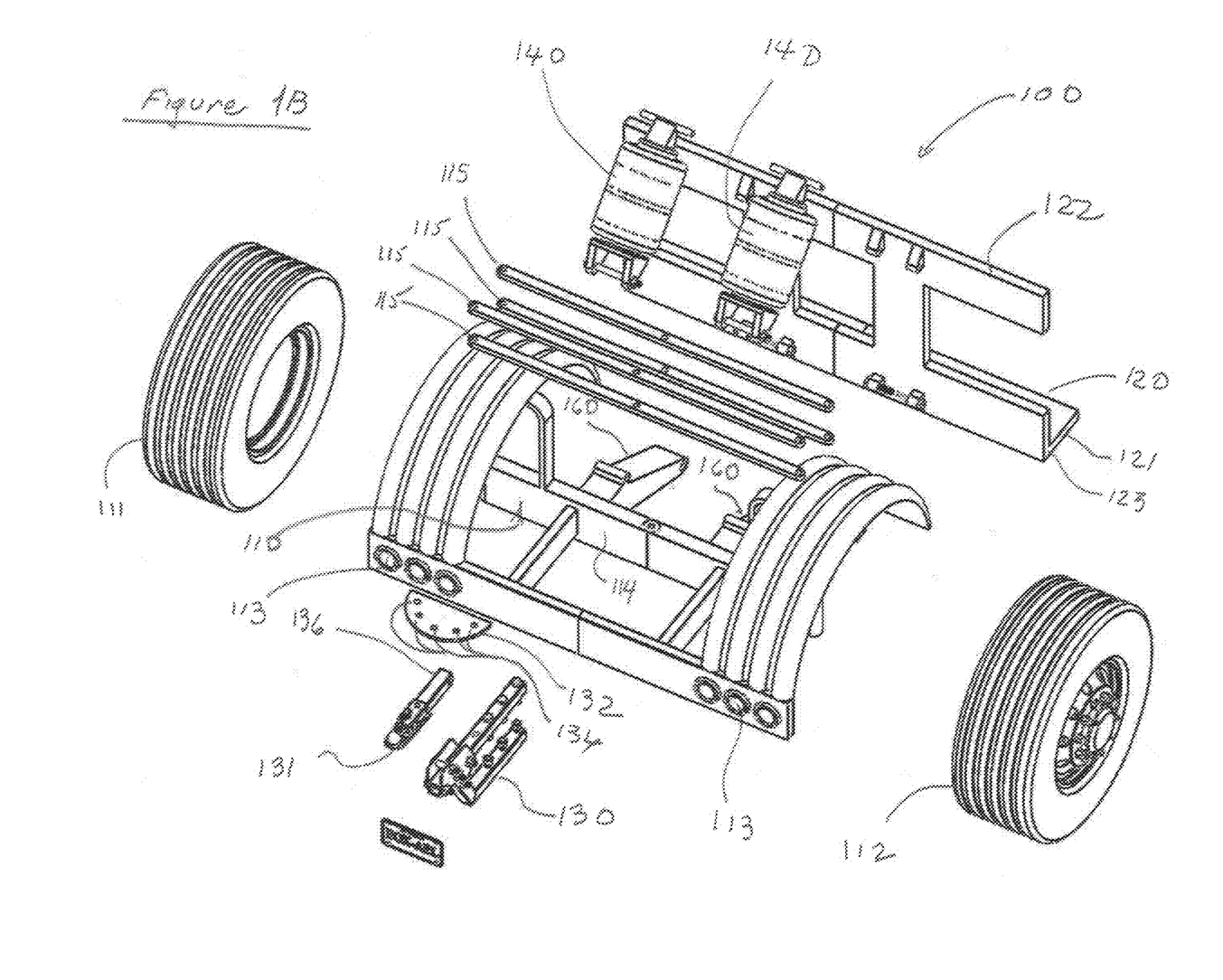
FIG. 1B is an exploded perspective view of the transport assembly of the present invention.

The transport assembly 100 includes a chassis 110 provided with a pair of opposed wheels 111 and 112, and a support assembly 120. The support assembly 120 is mounted to the chassis 110 in a manner that permits the support assembly 120 to pivot about an axis parallel to the ground, for example using two lever arms 160, shown in FIGS. 1B, 2B and 2C, which are rigidly attached to chassis 110. The wheels 111 and 112 are suitable for use on paved and unpaved roads and surfaces. The transport assembly 100 additionally includes lighting, such as brake lighting, back-up lighting, turn lighting and night lighting (denoted as lighting 113 in FIGS. 1A, 1B and 1C), which can be energized when the transport assembly 100 is used at the rear of shipping module 200, as discussed below.

The support assembly 120 includes a load-bearing structure 121 to carry that portion of the vertical loads that are imposed upon it during transport of a shipping module 200. The load-bearing structure 121 must be sufficiently robust to support the weight of the shipping module 200 imposed on it, as well as additional transient vertical shock loads resulting from road surface undulations, bumps, potholes, pavement cracks, etc. In the figures, while load-bearing structure 121 is depicted as a horizontal plate, any structure(s) that can function similarly would be suitable, such as tines, etc.

The support assembly 120 further includes a positioning structure 122 for locating the transport assembly 100 at a fixed position at the front or the back of a shipping module 200. In the embodiment shown in the figures, the load-bearing structure 121 and positioning structure 122 are plates joined at a right angle to form an L-shaped cradle 123, which mates with a lower transverse edge of the shipping module 200 and fixes the position of the transport assembly 100 relative to the shipping module 200. In the figures, while positioning structure 122 is depicted as a vertical plate, any structure(s) that can function similarly would be suitable, such a disk-shaped pads, etc.

Figure 2A:
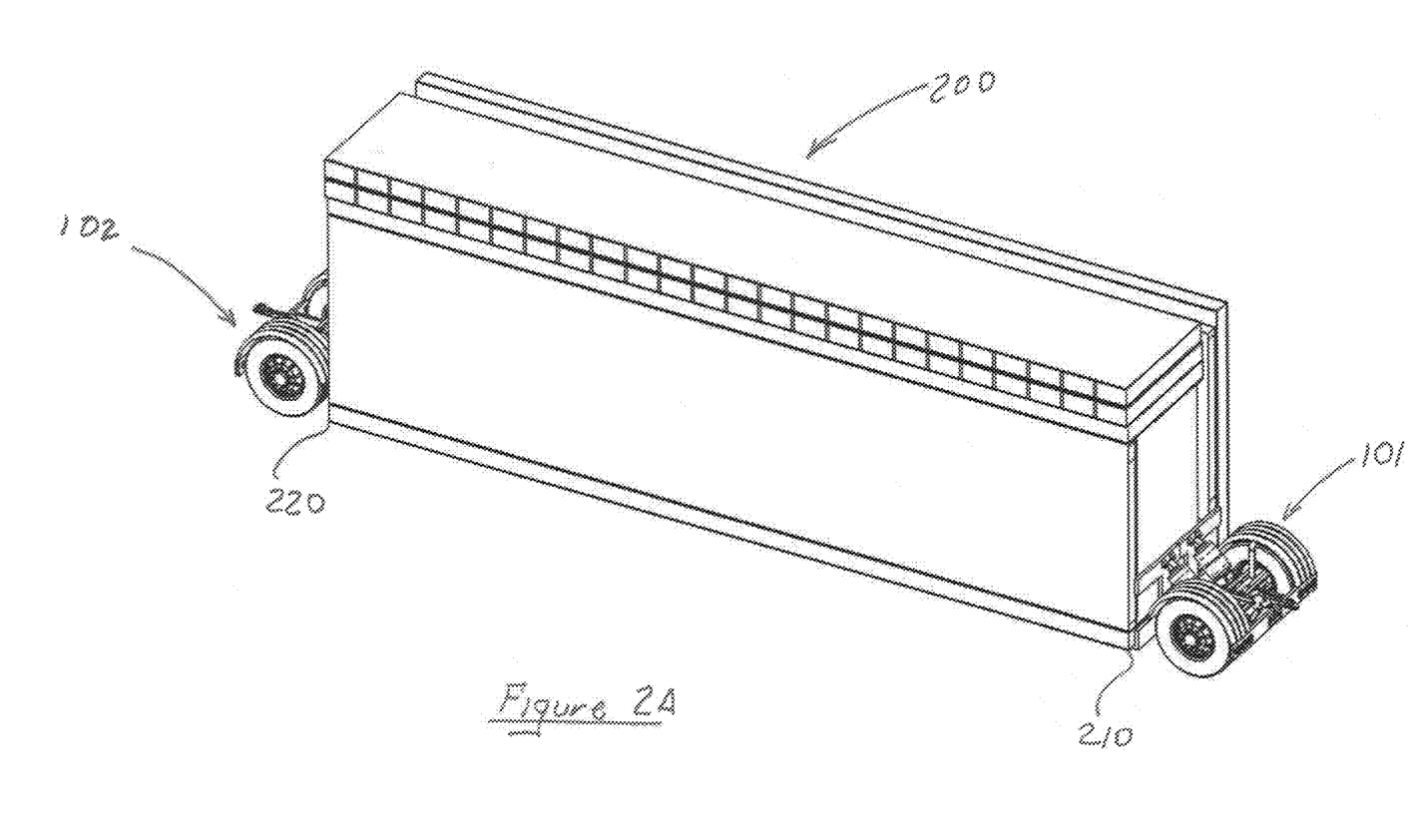
FIG. 2A depicts a perspective view of two of the transport assemblies of the present invention secured to a shipping module.

As shown in FIG. 2A, two transport assemblies 100 are used to permit rolling movement of a shipping module 200. One transport assembly 100, denoted in this disclosure as the leading transport assembly 101, is located at the lower front transverse edge of the shipping module 200, which is in the forward direction of travel. This lower front transverse edge is arbitrarily chosen as coincident with lower first transverse edge 210. A second transport assembly 100, denoted in this disclosure as the trailing transport assembly 102, is located at the lower rear transverse edge of the shipping module 200. This lower rear transverse edge is arbitrarily chosen as coincident with lower second transverse edge 220. The leading transport assembly 101 and trailing transport assembly 102 are identical in design and thus interchangeable.

Various means can be employed to secure each of the transport assemblies to its proper location on its lower end of the shipping module 200. For example, bolts passing through the positioning structure 122 can be used to secure each transport assembly 100 to the desired location. The shipping module 200 optionally is manufactured with integrated wiring 212 as part of its internal structure, as denoted by the hidden line (labelled 212) in FIG. 2B. Wiring 212 terminates proximate lower first transverse edge 210 and lower second transverse edge 220 with symmetrical connectors 213, such as those compatible with the SAE J560/ISO 1185 standards, the 7-pin round blade conventional connector, and the like. These connectors 213 allow lighting 113 of the trailing transport module 102 to be connected with a lighting connector on the towing vehicle to energize lighting 113. Since the leading transport assembly 101 and trailing transport assembly 102 are identical in design, wiring 212 and connectors 213 facilitate towing shipping module 200 from either end. Although depicted as part of the internal structure of module 212, wiring 212 alternatively can be affixed externally along the length of shipping module 212, and then removed following delivery of shipping module 212 to its final destination.

A tow arm 130 terminating at its distal end with a trailer hitch 131 is secured to the chassis 110 of the transport assembly 100. By attaching the trailer hitch 131 of one of the transport assemblies to a pick-up truck or other suitable vehicle, the shipping module 200 can be transported over the public roads from the manufacturing facility to the intended site.

The transport assembly 100 is steerable in the preferred embodiment, for example by utilizing in essence a four bar linkage. As a particular example, each of the wheels are rotatably mounted to kingpins (not visible) pivotally secured in the vertical direction to an axle frame 114 of chassis 110. The kingpins in turn are linked to each other by four connecting rods 115 arranged in two vertically juxtaposed pairs (visible for example in FIGS. 1A, 1B and 1C), which are pivotally connected to the kingpins on short struts or the like (not visible). The tow arm 130 is pivotally connected with connectors 116 to the axle frame 114 and connecting rods 115. Thus, any displacement of the tow arm 130 in a transverse direction causes the wheels to turn in the direction of movement of the tow arm 130.

The ability to turn the wheels advantageously decreases the turning radius of the shipping module 200/transport assembly 100 combination. A low turning radius can be particularly useful at the construction site, where turning space may be limited. Accordingly, the transport module is provided with a fixed radius pivot plate 132 mounted to the axle frame. The pivot plate 132 contains a number of pivot plate apertures 134 positioned at intervals around a circumference of the pivot plate. The tow arm 130 includes a tow arm aperture 137 fixed at a position along the tow arm 130 to successively overlay each pivot plate aperture 134 as the tow arm 130 is displaced. A removable peg (not shown) can be inserted through the tow arm aperture 137 and one of the pivot plate apertures to fix the angular orientation of the wheels 111, 112.

One of the pivot plate apertures 134, denoted in this disclosure as the road travel pivot plate aperture 135, is positioned so that when it is engaged by the peg inserted through the tow arm 130, the wheels 111, 112 are oriented parallel to the direction of travel. The balance of the other pivot plate apertures 134, denoted in this disclosure as the turning pivot plate apertures 136, are positioned so that when one of them is engaged by the peg inserted through the tow arm 130, the wheels are fixed at a specific non-zero angular orientation relative to the direction of travel.

In ordinary use, such as when transporting a shipping module 200 over public restricted access highways, the wheels of the trailing transport assembly 102 are oriented parallel to the direction of travel and the peg is inserted through the tow arm aperture 137 of that trailing transport assembly 102 to engage its road travel pivot plate aperture 135 so that the wheels cannot turn. The peg of the leading transport assembly 101 in comparison is not employed, and thus the wheels 111, 112 of the leading transport assembly 101 can turn in accordance with the direction of travel of the towing vehicle.

However, when a reduced turning radius is desired, such as when there is limited available turning area as may be found proximate to or in a construction site, the tow arm 130 of the trailing transport assembly 102 can be used to lever the wheels 111, 112 to a non-zero angular orientation relative to the direction of travel, such that the tow arm 130 aperture is in an overlying relationship with a turning pivot plate aperture 136, and the peg can be inserted to orient the trailing transport assembly 102 at a non-zero angular orientation relative to the direction of travel. This reduces the turning radius of the shipping module 200/transport assembly 100 combination, such as when the same is being backed or moved into position at a construction site.

Transport assembly 100 further includes two displacement actuators 140. The ends of each displacement actuator 140 are pivotally connected about a horizontal axis between the positioning structure 122 and the chassis 110. When actuated, the length of the displacement actuators will change. In the case where the transport assemblies are fixed in position to a shipping module 200, actuation of the displacement actuators will change the clearance between the shipping module 200 and the ground, referred to herein as the module ground clearance.

In the embodiment shown in the figures, displacement actuators 140 are vehicle suspension air bags, such as those currently commercially used in conventional truck, bus and car suspensions. Such air bags can be actuated in two ways. First, when connected to a compressed air source to energize the vehicle suspension air bags, the air bags will inflate, thus increasing ground clearance of the shipping module 200. Second, when the air is released from the air bag, as by simply opening for example a discharge valve connected to each of the vehicle suspension air bags, the air bags will deflate, thus decreasing ground clearance of the shipping module 200.

Figure 2B:
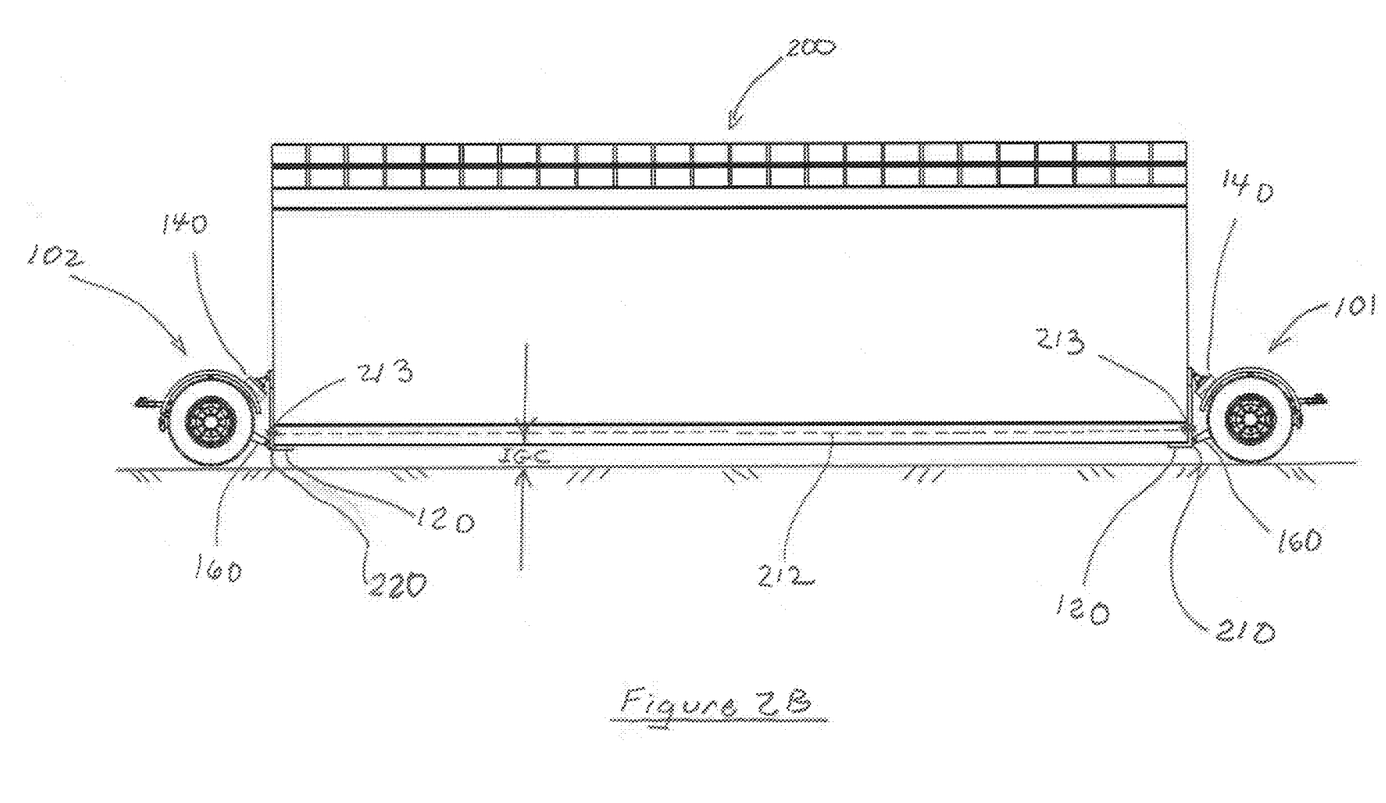
FIG. 2B depicts a front view of two of the transport assemblies of the present invention secured to a shipping module.
Figure 2C:
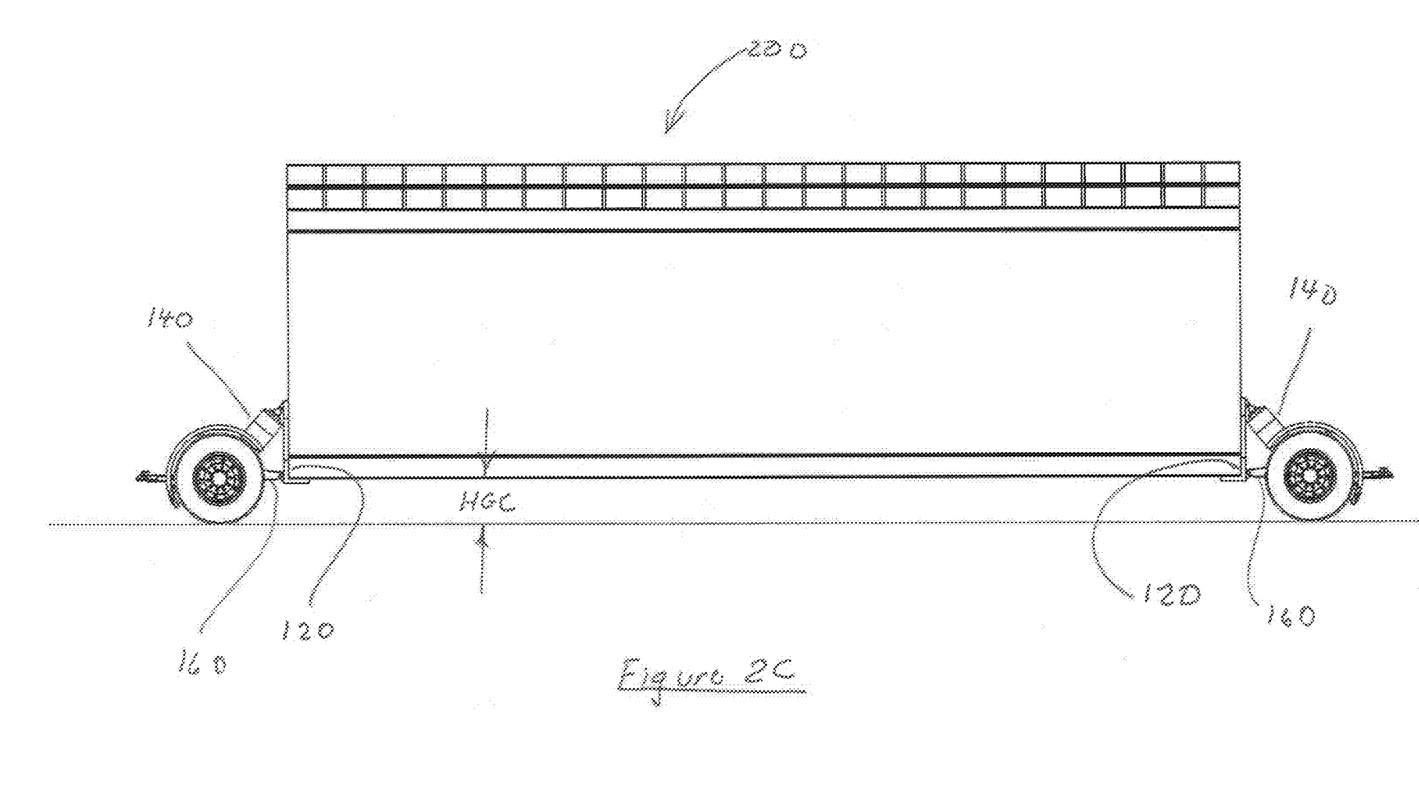
FIG. 2C depicts a front view of two of the transport assemblies of the present invention secured to a shipping module, wherein the displacement actuators have been actuated to increase ground clearance.
Figure 2D:
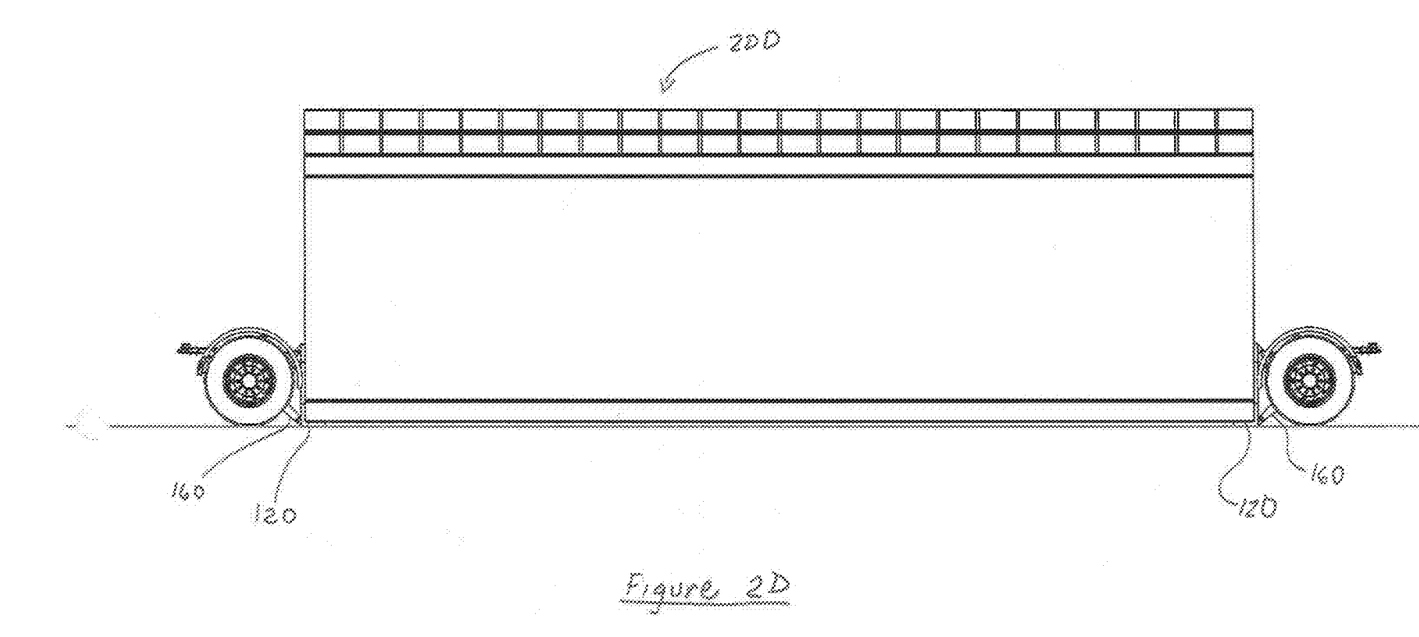
FIG. 2D depicts a front view of two of the transport assemblies of the present invention secured to a shipping module, wherein the displacement actuators have been actuated to reduce ground clearance.

Thus in ordinary use, such as when transporting a shipping module 200 over public restricted access highways, the displacement actuators 140 are set to yield an intermediate module ground clearance IGC, shown in FIG. 2B. However, when uneven terrain or the like is encountered, the displacement actuators 140 can be set to yield an higher ground clearance HGC, shown in FIG. 2C. Then when the desired drop-off point is reached, the displacement actuators 140 can be set to reduced or even zero ground clearance, shown in FIG. 2D. Thus the shipping module 200 can be lowered to the ground level (or onto temporarily placed shims), and the transport assemblies 100 can be unsecured from the shipping module 200 and removed. Tow arm 130 optionally can be articulated at point 136 to assist in maintaining a horizontal orientation in the region proximate to trailer hitch 131 during actuation of displacement actuators 140.

The use of vehicle suspension air bags as displacement actuators 140 has the additional benefit of replacing leaf springs and/or shock absorbers in transport assemblies 100. Because the air bags by their nature absorb road shock and vibration, they keep the shipping module 200 and its payload safe in transit from vibration and shock-induced damage, which might otherwise necessitate additional shock reducing and absorbing suspension parts.

To aid return of the transport assemblies 100, each transport assembly 100 is optionally equipped with a towing ball (not shown) that can receive the tow bar of another transport assembly 100. Thus in the case where the return distance is relatively modest, two or more transport assemblies 100 can be connected together in daisy-chain fashion, and towed back to a desired location, such as the shipping module 200 manufacturing facility. Alternatively, for shipment over relatively long distances, two or more transport assemblies can be stacked for shipment, and optionally are made narrow enough (in the direction normal to the direction of rolling travel) to fit inside a traditional shipping container.

The foregoing detailed description is for illustration only and is not to be deemed as limiting the inventions, which are defined in the appended claims.

What is claimed is:

1. A shipping assembly comprising:
   a rectilinear shipping module of interrelated and pivotally connected wall, floor and ceiling components of a structure for occupancy, the shipping module having a lower first transverse edge, a lower second transverse edge and a length;
   a first transport assembly and a second transport assembly, each transport assembly comprising a chassis; two opposed wheels pivotally mounted on the chassis to permit the transport assembly to be steered; means for fixing the angular orientation of the two opposed wheels at a select one of multiple angular orientations, so as to be able to vary the turning radius of the shipping assembly; a support assembly secured to the chassis and adapted to be positioned in a mating relationship with the shipping module proximate to a lower transverse edge of the shipping module; means for removably securing the support assembly to the shipping module; and a displacement actuator secured between the chassis and the support assembly, said displacement actuator for varying the ground clearance of the shipping module when secured to the support assembly;

the first transport assembly removably secured in a mating relationship with the shipping module proximate to the lower first transverse edge thereof, and the second transport assembly removably secured in a mating relationship with the shipping module proximate to the lower second transverse edge thereof; and a towing element secured to the chassis of the first transport assembly.

2. The shipping assembly as in claim 1, wherein the towing element is pivotally mounted about a horizontal axis.

3. The shipping assembly as in claim 1, wherein the displacement actuator of each of the first transport assembly and the second transport assembly is adapted to absorb road shock.

4. The shipping assembly as in claim 3, wherein the displacement actuator of each of the first transport assembly and the second transport assembly is a vehicle suspension air bag.

5. The shipping assembly as in claim 1, wherein the means for fixing the angular orientation of the two opposed wheels of the second transport assembly includes means for fixing such angular orientation so that the two opposed wheels of the second transport assembly are oriented parallel to the direction of travel of the shipping assembly.

6. The shipping assembly as in claim 1, wherein the support assembly of each of the first transport assembly and the second transport assembly includes a load-bearing structure to carry vertical loads imposed upon it during transport of the shipping module, and a positioning structure for locating the transport assembly at a fixed position proximate to a lower transverse edge of the shipping module.

7. The shipping assembly as in claim 6, wherein the load-bearing structure of each of the first transport assembly and the second transport assembly comprises a first plate and the positioning structure comprises a second plate perpendicularly oriented to the first plate.

8. The shipping assembly as in claim 1, wherein the support assembly of each of the first transport assembly and the second transport assembly comprises an L-shaped cradle.

9. The shipping assembly as in claim 1, wherein each of the first and second assemblies includes one or more of brake lighting, back-up lighting and night lighting.

10. The shipping assembly as in claim 9, further comprising integrated wiring within the internal structure of the shipping module terminating proximate the first lower transverse edge and the second lower transverse edge of the shipping module, and connected to energize the one or more of the brake lighting, back-up lighting and night lighting of the second transport assembly.

11. The shipping assembly as in claim 9, further comprising removable wiring affixed externally along the length of the shipping module and terminating proximate the first lower transverse edge and the second lower transverse edge of the shipping module, and connected to energize the one or more of the brake lighting, back-up lighting and night lighting of the second transport assembly.

12. The shipping assembly of claim 1, wherein the support assembly of each of the first transport assembly and the second transport assembly is pivotally connected to its respective chassis and the displacement actuator of each of the first transport assembly and the second transport assembly is adapted to change in size upon actuation, to cause the support assembly of each of the first transport assembly and the second transport assembly to pivot relative to its respective chassis upon actuation of its respective displacement actuator, and thereby to cause the ground clearance of the shipping module to vary.

* * * * *